T. HOWLAND.
RUBBER VALVE FOR PUMPS AND THE LIKE.
APPLICATION FILED MAR. 13, 1912.
1,040,334.
Patented Oct. 8, 1912.
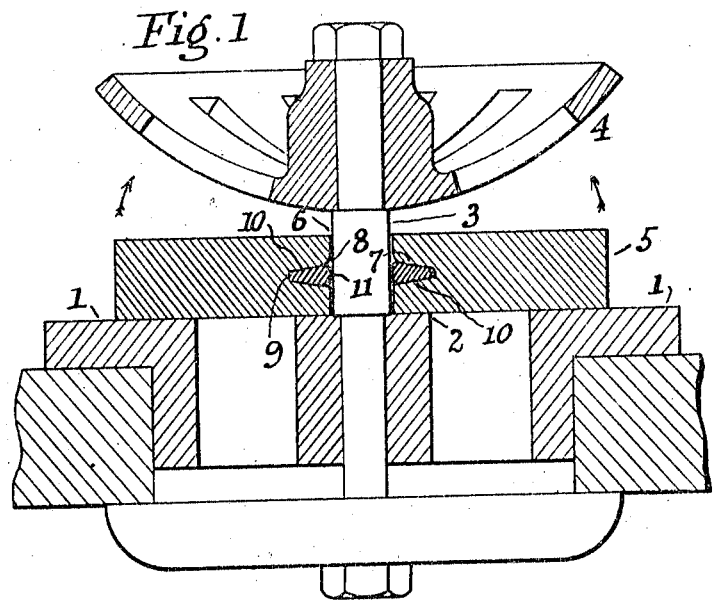
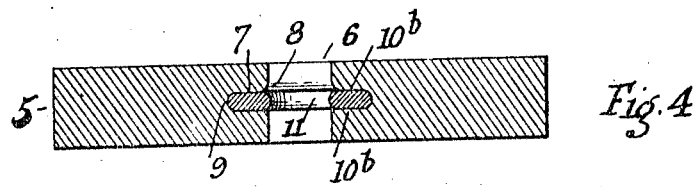
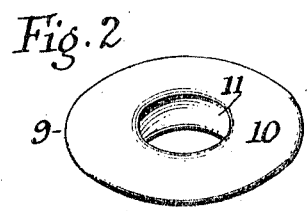
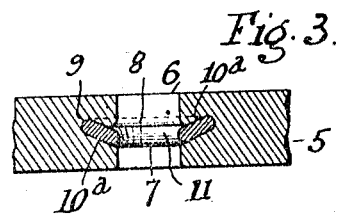
Witnesses
Irene Forrest
Edward H Tallson
Inventor
Thomas Howland
By Glenn S Noble
Attorney

UNITED STATES PATENT OFFICE.

THOMAS HOWLAND, OF MACKAY, QUEENSLAND, AUSTRALIA.

RUBBER VALVE FOR PUMPS AND THE LIKE.

1,040,334.　　　　Specification of Letters Patent.　　Patented Oct. 8, 1912.

Application filed March 13, 1912. Serial No. 683,449.

*To all whom it may concern:*

Be it known that I, THOMAS HOWLAND, a subject of the King of Great Britain and Ireland, &c., residing at Mackay, in the State of Queensland, Commonwealth of Australia, have invented certain new and useful Improvements in Rubber Valves for Pumps and the Like; and I do hereby declare the following to be a full, clear, and exact description of the invention, such as will enable others skilled in the art to which it appertains to make and use the same.

In many pumps there are now used rubber disk suction valves which are centrally perforated, each of which is during the operation of pumping required to bend or lift around its circumferences, while the whole valve may also lift to a slight extent its center sliding along a boss or stem. These valves work excellently at first, when new, but wear takes place around the edges of the central hole, which thus enlarges and may also wear to one side as well. The consequence is considerable leakage or loss of pumping efficiency, with stoppages of the pumping so that valves may be overhauled.

As a remedy the use of a bush of harder material within the rubber hole has been proposed and I have tried a ferrule or lining of metal. These devices however were not satisfactory. I have now found that a fairly narrow and deepset ring will give superior results. Each ring must be embedded or set in a fairly deep groove in the middle of the rubber, the visible edges of the ring coming about flush with the periphery of the disk hole. The success of this construction is due to the fact that although the valve can bend to and fro freely there is not the slightest danger of displacement of the ring or rings of metal or some material much more durable than rubber in such a situation. The groove by its depth aids the bending of the rubber and thus improves its action, thick rubber valves hitherto used having been found to so strongly resist the compression of their fibers during the opening as to be deemed objectionable by some engineers on that account. When a ring begins to a material extent to show wear it may be promptly discarded, as the rings will be cheap, and the cost of new ones from time to time will be negligible. These rubber valves will stand considerable pressure. They may be of large diameter, and being then comparatively expensive, the lengthening of the life of a valve produces further economy.

It is necessary, in order to put a ring into position, to bend the valve, using a holder such as a vise. My valve ring may be somewhat V shaped in section, or dished. The top and bottom in each case may be flat like a washer, or slope obliquely, with rounded sides. The groove in the rubber is shaped to correspond. The ring is not required to be a tight fit, as it will hold in position by reason of its depth.

My ring, according to my experiments, insures more water being pumped with a given quantity of fuel than is pumped when using a plain rubber disk; and I have taken a valve which had the central hole worn too large for use, and by making a deep groove in such hole, and inserting a ring, I have found that the valves so improved would last longer than a new plain rubber one. These rings stopped the valves from becoming laterally displaced and by insuring proper seating, caused good suction and discharge.

The ring is of much more durable material than rubber and may be of metal but not necessarily so. It is however important that it shall not be of such hard material as to grind into and wear the boss or spindle around which it is set. It will have to move slightly up and down the spindle and should do this easily, and by taking the wear, it thus promotes the life not only of the rubber but also of the boss. My ring can be used not only in those rubber valves that rotate a little at each pulsation, but also in others.

In the drawings herewith are illustrated combinations of parts in accordance with my invention.

Figure 1 shows a sectional view through a suction valve and its attachments. Fig. 2 is a perspective view on an enlarged scale showing a wear-taking ring before insertion. Figs. 3 and 4 are sectional views of modifications.

1, 2 indicates valve seating, 3 a boss or central spindle, 4 a guard, and 5 a rubber valve, which in practice is in some cases larger than is drawn. Its central hole is marked 6. In the walls of that hole a central or nearly central deep groove 7 is made,—shown deeper than it is high. It is advisable to have the upper side of the groove beveled or rounded off on its edge 8, the form of the opposite edge not mattering. 9 is a rounded edge on the outer circumference of the ring. The ring is shown in Fig. 1 with top and bottom faces tapering as at 10 or narrowing toward outer edge 9.

In Fig. 3 the ring is dished, its sides 10ª sloping or extending upward toward edge 9; these sides could be made to taper as in Fig. 1. The ring of Fig. 4 has flat sides as marked 10ᵇ. The inside edge 11 of each ring is rounded, and incloses the boss 3 but not tightly, the rubber also not being tight around the boss.

The thickness of the valve rubber above and below the ring is shown as considered by me to be most advantageous, and thus the ring thickness is, at its maximum, about a third of the thickness of the rubber, but may be thinner.

What I claim is:—

1. In rubber disk suction valves having a central hole to inclose a boss a deep narrow groove at or near the middle of the said hole, in combination with a ring having rounded inner and outer edges and of more durable material than rubber, and adapted to become worn by the said boss and to be renewed as indicated.

2. The combination of a rubber disk suction valve having a central hole therethrough with a comparatively deep narrow groove at or near the middle of said hole, with an annular ring of more durable material than rubber fitting within said hole, the inner diameter of said ring being slightly less than the diameter of the hole through the valve.

3. The combination with a rubber disk suction valve having a hole therethrough and having a relatively deep narrow groove at or near the middle of said hole, of a ring having substantially flat parallel sides with rounded inner and outer edges fitting within said groove.

In witness whereof I have hereunto set my hand in the presence of two witnesses.

THOMAS HOWLAND.

Witnesses:
WILLIAM ALFRED WRIGHT,
ANDREW RICHARD AVENELL.